United States Patent Office 3,226,388
Patented Dec. 28, 1965

3,226,388
9-DICYANOMETHYLENENITROFLUORENES
AND THE CHARGE-TRANSFER COM-
POUNDS THEREOF
Harris D. Hartzler, Wilmington, Del., assignor to E. I.
du Pont de Nemours and Company, Wilmington, Del.,
a corporation of Delaware
No Drawing. Filed Aug. 13, 1962, Ser. No. 216,325
13 Claims. (Cl. 260—268)

This invention relates to 9-dicyanomethylenenitrofluorenes (a new class of Lewis acids), to the charge-transfer compounds thereof with Lewis bases broadly, and to a process for preparing same. These new dicyanomethylene-substituted nitrofluorenes (referred to hereinafter for brevity as DCMNF) can also properly be described as $\Delta^{9,\alpha}$-nitrofluorenemalononitriles.

The new Lewis acids of the present invention can be represented by the following structural formula:

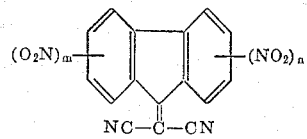

wherein $m$ and $n$ are integers, alike or different, from 0 to 2, with the sum of $m$ plus $n$ being from 1 to 4. The nitro substituents, of which from the foregoing there must be at least one, can be in the 1-, 2-, 3-, 4-, 5-, 6-, 7-, or 8-position. When more than one nitro substituent is present on either ring, they are not on adjacent ring carbons.

These new 9-dicyanomethylenenitrofluorenes are prepared by the condensation between the corresponding nitrofluoreneone and malononitrile in accord with the following stoichiometry:

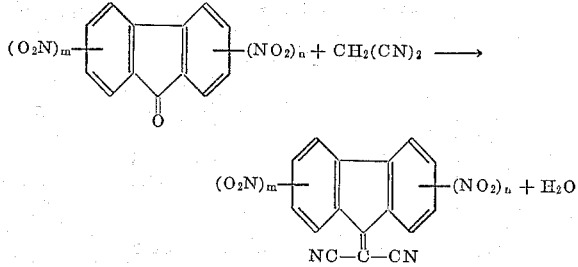

The condensation will normally be carried out in solution in a suitable inert diluent such as the aromatic hydrocarbons, e.g., benzene, toluene, xylene, and the like, the hydrocarbon and oxy-interrupted hydrocarbon ethers, such as diethyl ether, dibutyl ether, ethylene glycol dimethyl ether, polyethylene glycol dimethyl ether, and the like. Any solvent from which water can be removed as it is formed is satisfactory.

The following examples in which the parts given are by weight are submitted to illustrate further the present invention but not to limit it. The volume resistivity values given for the products were obtained on powder compacts using the so-called two-probe technique.

Example I

A mixture of 3.15 parts of 2,4,7-trinitro-9-fluoreneone, 0.70 part of malononitrile, 20 parts of the dimethyl ether of diethylene glycol (diglyme), and a trace of $\beta$-alanine was heated with stirring at 130–135° C. for 14 hours. The solvent was removed by distillation and the resulting crude, green product was recrystallized from chloroform. After filtration and drying, there was thus obtained 1.28 parts (35% of theory) of 9-dicyanomethylene-2,4,7-trinitrofluorene (DTNF) as yellow plates melting at 264.8°–265.2° C.

Analysis.—Calcd. for $C_{16}H_5N_5O_6$: C, 52.9%; H, 1.4%; N, 19.3%. Found: C, 52.6%; H, 1.8%; N, 19.1%.

Example II

A mixture of 30 parts of 2,4,7-trinitro-9-fluoreneone, 13 parts of malononitrile, about 10.5 parts of acetic acid, about 175 parts of benzene, and 0.30 part of $\beta$-alanine was stirred with heating at the reflux (80° C.) under a water separator for 18 hours. During this time 76% of the theoretical amount of water was formed. The reaction mixture was concentrated to a volume of about 50 parts and the resultant brown solid product was removed by filtration. After recrystallization from chloroform, filtration, and drying there was thus obtained 19.8 parts (57% of theory) of pure DTNF as yellow plates melting at 266.5–267.5° C.

A similar preparation varying the proportions slightly (51.4 parts of the trinitrofluoreneone, 18 parts of malononitrile, and 2.3 parts of $\beta$-alanine in a solvent mixture of about 23 parts of acetic acid and about 220 parts of benzene) was heated at the reflux under a water separator for 16 hours. After cooling the resulting reaction mixture and filtering, there was obtained 68.5 parts of crude dark green product from which, after recrystallization from chloroform, filtration, and drying, there was obtained 49 parts (84% of theory) of pure DTNF, M.P. 265–268° C.

Example III

A solution of 0.80 part of DTNF in about 20 parts of acetonitrile was mixed with a solution of 0.25 part of diaminodurene in about four parts of acetonitrile at room temperature. The resultant black precipitate was removed by filtration, washed with acetonitrile, and then dried. There was thus obtained 0.78 part (98% of theory) of the 1/1 diaminodurene/DTNF complex. The product exhibited a weak EPR signal and a volume resistivity of 2.9 x 10⁹ ohm-cm.

Analysis.—Calcd. for $C_{26}H_{21}N_7O_6$: C, 59.2%; H, 4.0%. Found: C, 59.3%; H, 4.2%.

Example IV

A solution of 0.50 part of 1,4-diazabicyclooctane in about four parts of acetonitrile was added to a solution of 0.80 part of DTNF in about 40 parts of acetonitrile. A purple-black color developed immediately, and a finely divided black precipitate slowly deposited. The reaction mixture was allowed to stand for two days at room temperature and the precipitate was removed by filtration, washed with acetonitrile, and dried. There was thus obtained 0.44 part of the 1/1 1,4-diazabicyclooctane/DTNF complex, exhibiting a weak EPR signal and a volume resistivity of 1.0 x 10¹⁰ ohm-cm. On standing, a second crop of the product, amounting to 0.11 part, was obtained thereby making the total yield 0.55 part (55% of theory).

Analysis.—Calcd. for $C_{22}H_{17}N_7O_6$: C, 55.6%; H, 3.6%; N, 20.6%. Found: C, 55.6%; H, 4.1%; N, 20.3%.

Example V

A solution of 3.5 parts of triethylamine in 50 parts of acetonitrile was mixed with a solution of 8 parts of DTNF in about 200 parts of acetonitrile. A dark color formed immediately, and the reaction mixture was allowed to stand for one hour at room temperature. The black, solid product was removed by filtration, washed with acetonitrile, and dried. There was thus obtained 4.7 parts (46% of theory) of the 1/1 triethylammonium⁺/DTNF⁻ anion-radical salt as black crystals exhibiting a strong EPR signal and a volume resistivity of 4.1 x 10⁵ ohm-cm.

Analysis.—Calcd. for $C_{22}H_{21}N_6O_6$: C, 56.8%; H, 4.6%; N, 18.0%. Found: C, 56.4%; H, 4.7%; N, 18.0%.

Example VI

A copper strip was suspended in a solution of 1.8 parts of DTNF in about 60 parts of acetonitrile. A back solid deposited on the metallic strip and was scraped off periodically. After 4½ days under these conditions, there was finally obtained 2.16 parts (quantitative yield) of the 1/1 copper+/DTNF⁻ anion-radical salt with one mole of $CH_3CN$ of crystallization, melting at 196–200° C. and exhibiting a volume resistivity at 8.8 x $10^6$ ohm-cm., and a moderately strong EPR signal.

*Analysis.* — Calcd. for $C_{16}H_5N_5O_6Cu:CH_3CN$: C, 46.2%; H, 1.7%; N, 17.8%; Cu, 13.6%. Found: C, 46.2%; H, 2.2%; N, 17.9%; Cu, 12.3%.

Example VII

A solution of 18 parts of anthracene and 36 parts of DTNF in 350 parts of methylene chloride was prepared. On standing at room temperature, a green solid precipitated within 15 minutes which was removed by filtration after one hour, washed with methylene chloride, and dried. There was thus obtained 30 parts (55% of theory) of the 1/1 anthracene/DTNF complex as green crystals melting at 228–232° C. and exhibiting a volume resistivity of 2.2 x $10^{14}$ ohm-cm.

*Analysis.* — Calcd. for $C_{20}H_{15}N_5O_6$: C, 66.5%; H, 2.8%; N, 12.9%. Found: C, 65.7%; H, 2.8%; N, 12.8%.

Example VIII

A solution of about 36 parts of DTNF in about 300 parts of methylene chloride was mixed with a solution of about 20 parts of pyrene in 350 parts of methylene chloride. A green color formed upon mixing, and on standing at room temperature a green solid precipitated out. This was removed by filtration, washed with methylene chloride, and dried. There was thus obtained about 45 parts (80% of theory) of the 1/1 pyrene/DTNF complex as green crystals exhibiting a volume resistivity of 3.7 x $10^{10}$ ohm-cm. and melting around 260° C. with decomposition.

*Analysis.* — Calcd. for $C_{32}H_{15}N_5O_6$: C, 68.0%; H, 2.7%; N, 12.4%. Found: C, 67.2%; H, 3.4%; N, 12.5%.

Example IX

A mixture of 13 parts of naphthalene and 36 parts of DTNF was dissolved in about 350 parts of methylene chloride. The solution turned red on mixing and was allowed to stand at room temperature for two hours. The reaction mixture was cooled to about −80° C. through the use of an external solid carbon dioxide/acetone bath. Upon filtration of the cooled reaction mixture and drying, there was thus obtained 34 parts (69% of theory) of the crude 1/1 naphthalene/DTNF complex as rust-colored plates melting at 260–263° C. and exhibiting a volume resistivity of 4 x $10^{13}$ ohm-cm.

*Analysis.*—Calcd. for $C_{26}H_{13}N_5O_6$: N, 14.2%. Found: N, 14.6%.

Example X

A mixture of four parts of DTNF, 4.8 parts of methyltriphenylphosphonium iodide, and five parts of mercury was stirred at room temperature for six days in about 125 parts of acetonitrile. The mixture was filtered to remove the mercury and the filtrate was concentrated to about one-half the original volume by evaporation. Upon filtration, there was obtained 2.6 parts of purple solid, which was dissolved in about 20 parts of ethylene chloride and precipitated with about 40 parts of benzene. Upon filtration and drying, there was thus obtained 0.7 part of the 1/1 methyltriphenylphosphonium+/DTNF⁻ anion-radical salt as purple crystals melting at 168.5–171.0° C. and exhibiting a volume resistivity of 7.8 x $10^{12}$ ohm-cm.

*Analysis.* — Calcd. for $C_{35}H_{23}N_5O_6P$: N, 10.9%; P, 4.8%. Found: N, 11.0%; P, 3.9%.

Example XI

A mixture of 36 parts of DTNF and 11 parts of hydroquinone in about 160 parts of acetonitrile was stirred for two days at room temperature, during which time a solid separated from the solution. This was removed by filtration and there was thus obtained 21 parts of the crude hydroquinone/DTNF 1/1 complex as a gray-green solid. Recrystallization from ethyl acetate afforded 16 parts (30% of theory) of the purified 1/1 hydroquinone/DTNF complex as crystals melting at 249.6–250.4° C. The complex dissociated into components in acetonitrile solution as judged by UV spectra, which indicates a composition of between 75 and 80% DTNF. The calculated amount of DTNF in the material is 76.7%.

*Analysis.* — Calcd. for $C_{22}H_{11}N_5O_8$: C, 55.8%; H, 2.3%; N, 14.8%. Found: C, 56.4%; H, 2.6%; N, 15.0%, 15.1%.

Example XII

To a boiling solution of 1.45 parts of DTNF in about 19.5 parts of acetonitrile was added a boiling solution of 0.26 part of quinoline and 0.17 part of durohydroquinone in about four parts of boiling acetonitrile. The reaction mixture was then ice-cooled and in about one-half hour blue-black needles of the 1/1 quinolinium+/DTNF⁻ anion-radical salt collected by filtration and washed on the filter with methylene chloride. There was obtained 0.43 part (25% of theory) of the 1/1 anion-radical salt melting at 150–152° C. with decomposition and exhibiting a volume resistivity of 7.7 x $10^5$ ohm-cm.

*Analysis.* — Calcd. for $C_{25}H_{13}N_6O_6$: C, 60.9%; H, 2.7%; N, 17.0%. Found: C, 61.9%; H, 2.9%; N, 17.2%.

Example XIII

A mixture of four parts of tetramethylammonium iodide, 7.3 parts of DTNF, six parts of mercury, and 85 parts of acetonitrile was stirred under nitrogen at room temperature for 18 hours. The resulting solid precipitate was collected by filtration and dried to afford nine parts of the crude 1/1 tetramethylammonium+/DTNF⁻ anion-radical salt. After recrystallization from acetonitrile, the pure 1/1 salt was obtained as crystals melting at 275–277° C. with decomposition. Volume resistivity, 1.2 x $10^7$ ohm-cm.

*Analysis.*—Calcd. for $C_{20}H_{17}N_6O_6$: N, 19.2%. Found: N, 19.5%, 19.2%.

Example XIV

A mixture of one part of n-butylamine, 3.65 parts of DTNF, and 40 parts of acetonitrile was stirred at room temperature under nitrogen for 18 hours. After filtration and drying there was thus obtained 1.3 parts of the 1/1 n-butylammonium+/DTNF⁻ anion-radical salt as a purple solid. After recrystallization from acetonitrile, the purified product was obtained as crystals melting at 200–205° C. with decomposition. Volume resistivity, 3.8 x $10^7$ ohm-cm.

*Analysis.*—Calcd. for $C_{20}H_{17}N_6O_6$: C, 55.0%; H, 3.7%. Found: C, 55.0%; H, 3.9%.

The charge-transfer compound dissolved in ethyl acetate to give a purple solution. This solution was coated pattern-wise on paper and the coated paper allowed to dry. There remained a purple pattern of the solid charge-transfer compound corresponding to the wetted portions.

This outline or pattern was easily copied using a commercial thermographic copying machine and methods as described in U.S. Patent 2,740,895 and U.S. Patent 2,740,896. The outline was reproduced in faithful detail in good contrast. Volume resistivity, 1.9 x 10$^6$ ohm-cm.

*Example XV*

A mixture of 3.6 parts of DTNF, 0.5 part of triethylamine, and 24 parts of acetonitrile was stirred at room temperature for 18 hours under nitrogen. The reaction mixture was evaporated to dryness under a high vacuum to afford 4.1 parts of the

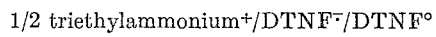

complex anion-radical salt. Volume resistivity, 2.6 x 10$^9$ ohm-cm.

*Analysis.*—Calcd. for $C_{38}H_{26}N_{11}O_{12}$: N, 18.6%. Found: N, 18.8, 18.7%.

An ethyl acetate solution of the

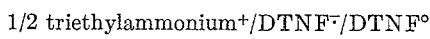

complex anion-radical salt was used to dye a sample of so-called record cloth. This is a test fabric used in the trade comprising adjacent woven panels of different commercially available fabrics woven from such fibers as cotton, nylon, wool, silk, viscose rayon, polyethylene terephthalate, and a vinyl chloride/acrylonitrile copolymer. In all instances the panels were dyed black which was fast to washing. The nylon, silk, and vinyl chloride/acrylonitrile copolymer panels were noticeably darker in shade than the others.

The new 9-dicyanomethylenenitrofluorenes are prepared by direct condensation under slightly acidic or slightly basic conditions between the requisite nitro-9-fluoreneone and malononitrile. The two reactants are preferably used in essentially equimolar reactive proportions. The condensation normally is carried out at temperatures in the range —25 to +250° C. or higher, preferably between 0 and 125° C., and for convenience most preferably in the range 50 to 100° C.

In the step of condensing the nitro-9-fluoreneones with malononitrile, the presence of a catalyst is necessary. This catalyst can be an acid or a base or a salt which ionizes in water to give an acidic or basic solution. Thus, there can be employed any of the wide variety of catalysts that have been shown to be useful in the Knoevenagel and aldol condensations. Active catalysts includ hydrochloric acid, sodium and potassium carbonates, sodium and potassium cyanides, sodium acetate, ammonium acetate, piperidinium acetate, sodium bisulfite, sodium hydroxide, trisodium phosphate, diethylamine, zinc chloride, sodium methoxide, acidic or basic ion-exchange resins, pyridine, piperidine, and the like.

In the condensation step, water is always formed and the yields and conversions are sometimes improved if it is removed as it is formed. This can be done by added dehydrating agents, by simple distillation, or by refluxing the reaction mixtures in the presence of an inert, organic liquid immiscible with water, such as a hydrocarbon, and separating the water from the reflux condensate.

The nitro-substituted 9-fluoroeneone coreactants of the present invention include the mono-, di-, tri-, and tetranitro-9-fluoreneones. Thus, the specific coreactants for condensation with malononitrile include the 2-, 3-, and 4-mononitro-9-fluoreneones, the 2,5- and 2,7-dinitro-9-fluoreneones, the 2,4,5- and 2,4,7-trinitro-9-fluoreneones, and the 2,4,5,7-tetranitro-9-fluoreneones. From these, by condensation with malononitrile as outlined in the foregoing, there will be obtained the 9-dicyanomethylene-2-, -3-, and -4-mononitrofluorenes, the 9-dicyanomethylene-2,5- and -2,7-dinitrofluorenes, the 9-dicyanomethylene--2,4,5- and -2,4,7-trinitrofluorenes, and 9-dicyanomethylene-2,4,5,7-tetranitrofluorene of the present invention.

As evidenced by the foregoing detailed species, the charge-transfer compounds of the nitro-9-dicyanomethylenefluorenes of the present invention are generically colored solids with good thermal stability. This is especially true of the ion-radical salts. This combination of properties makes them particularly useful as coloring agents and/or pigments, especially the latter, for a wide range of organic or inorganic compositions and particularly for such polymeric film- and fiber-forming compositions where coloring and/or pigmenting requirements and techniques are well known.

The nitro-substituted 9-dicyanomethylenefluorenes of the present invention are also useful as dyes for the dyeing and coloration of fabrics, films textiles, thread, and the like. The charge-transfer compounds of these nitro-substituted 9-dicyanomethylenefluorenes with Lewis bases broadly, including both the simple complexes and the anion-radical charge-transfer salts, and especially the latter, absorb significantly in the near infrared region. This porperty makes the materials extremely useful as coloring agents for inks, particularly for ballpoint inks, which thereby results in the formation of copy matter which can be copied thermographically.

The present invention is generic to the nitro-substituted 9-dicyanomethylenefluorenes and the charge-transfer compounds thereof with Lewis bases broadly, including specifically both organic and organo-inorganic Lewis bases. For brevity, the nitro-substituted 9-dicyanomethylenefluorenes will be referred to as DCMNF.

The charge-transfer compounds of DCMNF with Lewis bases can broadly be formulated as

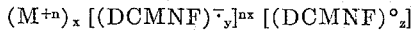

wherein $n$ is the formal positive charge on the cation M; $x$ is the number of said cation species present, which in the plural instance includes mixed individual cations; $nx$ is the total negative charge on the charged DCMNF moieties, i.e., the charge-transfer compound is overall electronically neutral; $y$ is the number of negatively charged DCMNF species present; and $z$ is the number of combined neutral species present, if any, where ° indicates no net charge on said combined neutral species, — indicates a negative ionic charge, · an electron, and $x$, $y$, and $z$ are numbers, alike or different, both whole and fractional, $x$ and $y$ being from 1 to 6, and $z$ from 0 to 6. Thus, broadly speaking, these charge-transfer compounds can be described in two general types of the formulas

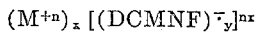

i.e., the simple salts, wherein there are no combined neutrals species, and

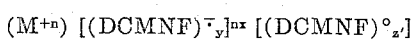

i.e., the complex salts, where $z'$ is a number from 1 to 6. A specific example is the triethylammonium charge-transfer complex salt

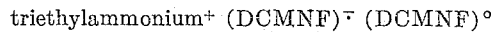

The charge-transfer compounds include those with the simple monovalent anion radicals

in which one electron has been transferred per DCMNF species. These can be illustrated by the structures

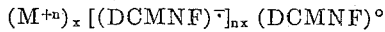

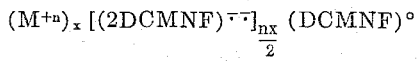

and the like.

The invention also obviously includes the charge-transfer compounds where more than one electron has been transferred in one or more DCMNF moiety, e.g., of the type $$(M^{+n})_x [(DCMNF)^{--}]_{\frac{nx}{2}}$$

$$(M^{+n})_x [(DCMNF)^{--}]_{\frac{nx}{2}} (DCMNF)^°_z$$

$$(M^{+n})_x [(DCMNF)^{-}]_{nx}[\cdot(DCMNF)\cdot]^°_z$$

$$(M^{+n})_x [(DCMNF)^{=}]_{\frac{nx}{2}}$$

and the like.

These all represent electronic resonance hybrid structures. In the latter group different electronic configurations in the sense of the number of electrons involved per moiety differ but the overall charge of the complexes in all cases remains neutral. As is conventionally accepted, it is not intended to represent structurally all the resonance hybrids contributing to the stable ground state of any one of these charge-transfer compounds. For convenience and brevity throughout this specification, the single anion-radical representation will be used, i.e., in the format $$(DCMNF)^{-}$$

to include thereby all possibly contributing electronic resonance hybrid forms.

It is also intended to include in these charge-transfer compounds, including compounds containing more than one cation per molecule, defect-type structures quite parallel to the well-known oxygen-deficient metal oxides, as well as the metal-deficient metal oxides. Thus, these charge-transfer compounds include species which can be deficient in either or both the cation or anion portions.

Charge-transfer compounds of previously known Lewis acids with Lewis bases are well known in the art. Frequently these charge-transfer compounds were referred to as Pi complexes. More recently, the concept has become well established that such complexes are more properly described as charge-transfer compounds—see, for instance, Mulliken, J. Am. Chem. Soc. 74, 811 (1952). The charge-transfer compounds of DCMNF with Lewis bases range in degree of charge-transfer from those of true complex structure to those where actual and complete charge-transfer exists in the ground electronic state. Compounds of the last-mentioned type constitute so-called anion-radical salts wherein at least one molecule of DCMNF carries a transferred electron and accordingly has a negative electronic charge, and at least one molecule of the Lewis base component has donated at least one electron to the DCMNF component and accordingly has an electron deficiency, and, therefore, a positive electronic charge. The invention is generic to those charge-transfer compounds of DCMNF with Lewis bases which exhibit a detectable paramagnetic resonance absorption under normal conditions. It is likewise generic to DCMNF charge-transfer compounds wherein the maximum charge transfer occurs not in the ground electronic state but rather in the excited state (see Orgel, Quart. Rev. Chem. 8, 1422 (1954) for a discussion of this type of normally diamagnetic charge-transfer compounds).

Lewis bases, which with DCMNF form the necessary second component for forming the charge-transfer compounds of DCMNF, are well known to the chemical art (see G. N. Lewis, J. Franklin Inst. 226, 293 (1938) and following papers by Lewis and several coauthors). Broadly speaking, the Lewis base is, by definition, a molecule, the structure or configuration of which, electronically speaking, is so arranged that the molecule is capable of donating one or more electrons to a molecule which has an electron-deficient structure. Many and varied electron donor compounds are known. To list but a few well-recognized such classes there need only be named the amines and various alkyl and aryl hydrocarbon-substituted amines which may be described structurally by the following two formulas:

where $R_1$, $R_2$, $R_3$ are H, alkyl, or alkylene up to 20 carbons but when $R_1$ is aryl, $R_2$ and $R_3$ are H or alkyl up to 20 carbons, and the corresponding quaternary ammonium salts as described below;

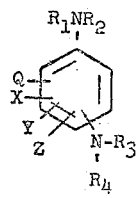

where the amino substituents are ortho or para to each other and $R_1$, $R_2$, $R_3$, $R_4$ are alkyl up to 20 carbons and Q, X, Y, Z are H or hydrocarbon up to 20 carbons, which can be joined together, or other ortho- or para-directing substituents with the provisos that (1) when $R_1$, $R_2$, $R_3$, and $R_4$ are alkyl, Q and X are H, (2) when $R_1$ and $R_3$ are aryl, $R_2$ and $R_4$ are H or alkyl, and (3) where Q—X and/or Y—Z taken pairwise are cycloalkylene or fused aromatic, $R_1$ and $R_3$ are H, and the corresponding quaternary ammonium salts wherein the quaternary radical is another $R_1$, $R_2$, $R_3$, $R_4$ and any of the usual anions is involved.

Also included are the substituted amines of the alkyl and aryl hydrocarbon-substituted types defined by the foregoing two structural formulas wherein $R_1$, $R_2$, $R_3$, and/or $R_4$ are variously oxaalkylene or thiaalkylene or oxaalkyl or thiaalkyl, e.g., 4-thiapiperidine, as well as the hydroiodides of the foregoing primary, secondary, or tertiary amines, and also the corresponding quaternary ammonium iodides, e.g., morpholine hydroiodide; all heterocycles containing nuclear nitrogen and the hydroiodides or alkyl iodide salts thereof; substituted ethylenes of the type

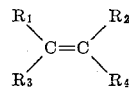

wherein from one to four of the $R_1$, $R_2$, $R_3$, or $R_4$ groups are amino or alkylamino, any remaining being alkyl, alkoxy, alkoxythio, aryl, aryloxy, or arylthio; and the hydroiodide or alkyl iodide salts thereof, including the plain iodides, e.g., of the aminium type

and the Wurster iodides of aromatic amines, e.g., Wurster's blue iodide,

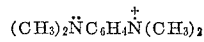

(in the foregoing diamines, it is expressly intended to include polynuclear diamines in which the nitrogens are connected by a conjugated system), the phosphines and alkyl or aryl hydrocarbon-substituted phosphines:

where $R_1$, $R_2$, and $R_3$ are alkyl ar aryl up to 20 carbons (the aryls being unsubstituted or having o- and p-directing substituents),

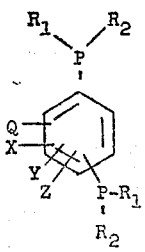

where $R_1$, $R_2$, Q, X, Y, and Z are as above in the aryl amine analogs except that $R_1$ and $R_2$ cannot be H, and the corresponding quaternary phosphonium salts wherein the quaternary radical is another $R_1$, $R_2$, $R_3$ and any of the usual anions is invloved; the arsines and alkyl and aryl hydrocarbon-substituted arsines:

where $R_1$, $R_2$, and $R_3$ are as above in the phosphine analogs;

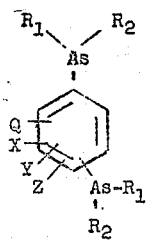

where $R_1$, $R_2$, Q, X, Y, and Z are as above in the aryl phosphine analogs, and the corresponding quaternary arsonium salts wherein the quaternary radical is another $R_1$, $R_2$, $R_3$ and any of the usual anions is involved; the stibines and alkyl and aryl hydrocarbon-substituted stibines:

where $R_1$, $R_2$, and $R_3$ are as above in the arsine analogs,

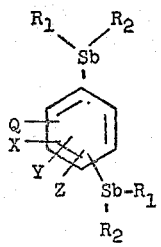

where $R_1$, $R_2$, Q, X, Y, and Z are as above in the aryl arsine analogs, and the corresponding quaternary stibonium salts wherein the quaternary radical is another $R_1$, $R_2$, $R_3$ and any of the usual anions is involved; the quanternary ammonium bases or their salts, such as $R_1R_2R_3R_4N^\oplus$ where $R_1$, $R_2$, $R_3$, and $R_4$ are H or alkyl up to 20 carbons; metal cations describable by $M^{+x}$ where M is a metal and $x$ is the formal cationic valence of the metal; metal chelates having all planar configurations, the atoms which coordinate with the metal being joined by a conjugated system of double bonds (aromatic or open chain); aromatic or heterocyclic aromatic amino-phenols or ethers, the O and N atoms being connected by a conjugated system of double bonds; aromatic hydrocarbon or alkyl-substituted aromatic hydrocarbons including polynuclear ones; and polyhydric phenols and ethers thereof.

In all the foregoing instances, the molecular structure in the hydrocarbon moieties can also carry functional substituents. The preferred substituents can be classed as those which, when present on ring carbon of an aromatic nucleus, tend to direct any entering substitutent radical into the ortho- or para-position, i.e., the so-called ortho-para orienting groups. These substituents have also been described by Price, Chem. Rev. 29, 58 (1941), in terms of the electrostatic polarizing force (as measured in dynes) of the said substituent groups on an adjacent double bond of the benzene nucleus. Quantitatively, any substituent which has or exhibits an electrostatic polarizing force in dynes less than 0.50 can be regarded as ortho-para orienting and electropositive, and is preferred here. These preferred substituents include: alkyl hydrocarbon up to 20 carbons; substituted alkyl up to 20 carbons, e.g., aminoalkyl, hydroxyalkyl, alkoxyalkyl, vinylalkyl, haloalkyl; hydroxy; alkoxy up to 20 carbons; thiol, alkyl thiol (up to 20 carbons); amino; N-alkylamino or N,N-dialkylamino with alkyls up to 20 carbons; N-monoarylamino; and the like.

Suitable specific Lewis bases for making the DCMNF/Lewis base charge-transfer compounds in molar ratios from 2/1 to 1/2 are given in the following list. In connection with the molar ratios just given, it is to be understood that the present charge-transfer compounds lie within the arithmetical range of the two molar ratio extremes and not solely at the extremes. Thus, charge-transfer compounds of the present invention are inclusive of, for instance, 3/2, 1.5/1, and the like DCMNF/Lewis base charge-transfer compounds. Useful specific Lewis bases include: ammonia, and amines, such as ethylamine, methylamine, dibutylamine, tridecylamine, and the like; diamines, such as 2,3-N,N,N′,N′-hexamethyl-p-phenylenediamine, N,N′-dioctyl-1,5-diaminonaphthalene, 1,4-diamino-5,6,7,8-tetrahydronaphthalene, and the like; phosphines and diphosphines, such as triphenylphosphine, tributylphosphine, ethyldioctylphosphine, 1,4 - bis(diethylphosphino)benzene, and the like; ammonium and quaternary ammonium bases and salts, such as ammonium iodide, ethyltrimethylammonium iodide, dioctylammonium iodide, methyltri - n - propylammonium iodide, tetramethylammonium hydroxide, and the like; metals, such as Na, K, Li, Ag, Cu, and the like; metal precursors, such as the carbonyl, iodides, cyanides, e.g., iron and cobalt carbonyls, iodides, cyanides, and the like; metal chelates, such as copper salicylaldimine, cobalt pyrrolealdehydeimine, nickel 4-methoxysalicylaldoxime, copper 5-methoxy-8-quinolinolate, and the like; heterocyclic aromatic amines, phenols, and ethers, such as 4-aminopyridine, 3-hydroxyacridine, 3-dimethylaminocarbazole, 2-methoxyphenazine, and the like; aromatic hydrocarbon ethers, such as phenetidine, N,N-diethylanisidine, and the like; aromatic hydrocarbons and alkyl substituted aromatic hydrocarbons, including polynuclear, such as chrysene, coronene, hexamethylbenzene, 2-ethylphenanthrene, and the like.

The charge-transfer complexes of DCMNF with Pi or Lewis bases are generically colored, usually with characteristic deep shades of color. Accordingly, the formation of these complexes with DCMNF is basis for a method involving the detection and identification of Lewis bases. The DCMNF Lewis base complexes with the stronger Lewis bases are paramagnetic and thus have usefulness in recognized uses for paramagnetic materials. These paramagnetic complexes are generically characterized by exhibiting paramagnetic absorption in the electron paramagnetic resonance spectrum (EPR absorption).

The DCMNF charge-transfer complexes are generically colored and accordingly find use in any of the many well-known and established uses for colored materials. Thus, in the case of the colored solutions, these are useful in obtaining decorative color effects. In the case of the DCMNF charge-transfer complexes with stronger Lewis bases, the complexes are colored solids, irrespective of whether the complex is paramagnetic or not. These colored solid complexes find use in many well-established fields, such as dyes and pigments for both paints and plastics, and colored fillers for the latter.

Since all DCMNF charge-transfer complexes are colored, the controlled formation thereof forms the basis for still another use, viz., the reproduction of text matter by impact printing, i.e., by the pressure formation of graphic images. Thus, one sheet of the carrier, e.g., paper, is impregnated with a solution of DCMNF and the solvent removed via evaporation, leaving the DCMNF deposited in, on, and through the paper carrier. Another separate sheet of paper is similarly so treated with a Lewis base. A laminate of the two sheets will reproduce a colored image in the second sheet made by pressure of the first sheet.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A nitrofluorene compound selected from the class consisting of (I) 9-dicyanomethylenenitrofluorene compounds of the formula

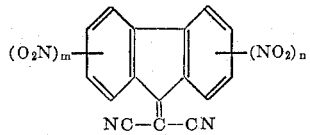

wherein $m$ and $n$ are integers from 0 to 2 inclusive with the proviso that the sum of $m$ plus $n$ is from 1 to 4 inclusive and with the proviso that when more than one nitro substituent is present on either ring, said substituents are not on adjacent ring carbons, and (II) charge-transfer compounds of the above defined 9-dicyanomethylenenitrofluorene compounds with Lewis bases.

2. A 9-dicyanomethylenenitrofluorene compound of the formula

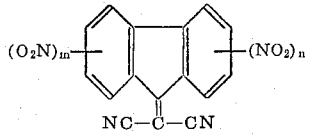

wherein $m$ and $n$ are integers from 0 to 2 inclusive with the proviso that the sum of $m$ plus $n$ is from 1 to 4 inclusive and with the proviso that when more than one nitro substituent is present on either ring, said substituents are not on adjacent ring carbons.

3. A charge-transfer compound of a 9-dicyanomethylenenitrofluorene compound as set forth in claim 2 with a Lewis base.

4. A salt charge-transfer compound of the formula $$(M^{+n})_x [(DCMNF)^-_y]^{nx}$$

wherein M is a cation of a Lewis base; $n$ is the formal positive charge on the cation M; $x$ is the number of said cation species present, which in the plural instance includes mixed individual cations; DCMNF is the 9-dicyanomethylenenitrofluorene moiety; $^-$ indicates a negative ionic charge and $\cdot$ an electron; $y$ is the number of negatively charged DCMNF moieties present; and $nx$ is the total negative charge on the DCMNF moieties.

5. A salt charge-transfer compound of the formula $$(M^{+n})_x [(DCMF)^-_y]^{nx} [(DCMNF)^°_z]$$

wherein M is a cation of a Lewis base; $n$ is the formal positive charge on the cation M; $x$ is the number of said cation species present, which in the plural instance includes mixed individual cations; DCMNF is the 9-dicyanomethylenenitrofluorene moiety, $^-$ indicates a negative ionic charge and $\cdot$ an electron; $y$ is the number of negatively charged DCMNF moieties present; $nx$ is the total negative charge on the DCMNF moieties; $°$ indicates no net charge on the combined neutral DCMNF moieties; and $z$ is the number of combined neutral DCMNF moieties present.

6. A charge-transfer compound as defined in claim 4 wherein said DCMNF moiety represents 9-dicyanomethylene-2,4,7-trinitrofluorene.

7. A charge-transfer compound as defined in claim 5 wherein said DCMNF moiety represents 9-dicyanomethylene-2,4,7-trinitrofluorene.

8. 9-dicyanomethylene-2,4,7-trinitrofluorene.

9. The 1/1 diaminodurene/9-dicyanomethylene-2,4,7-trinitrofluorene complex.

10. The 1/1 diazobicyclooctane/9-dicyanomethylene-2,4,7-trinitrofluorene complex.

11. The

1/1 methyltriphenylphosphonium$^+$/9-dicyanomethylene-2,4,7-trinitrofluorene$^-$ anion-radical salt.

12. The

1/2 triethylammonium$^+$/9-dicyanomethylene-2,4,7-trinitrofluorene$^-$/9-dicyanomethylene-2,4,7-trinitrofluorene$^°$ complex anion-radical salt.

13. Process which comprises reacting a 9-dicyanomethylenenitrofluorene compound with a Lewis base and recovering the resultant charge-transfer compound of said 9-dicyanomethylenenitrofluorene.

References Cited by the Examiner

UNITED STATES PATENTS

| | | | |
|---|---|---|---|
| 2,206,108 | 7/1940 | Muller et al. | 260—465 |
| 2,280,058 | 4/1942 | Bruson | 260—465 |
| 2,301,518 | 11/1942 | Bruson | 260—465 |
| 2,682,562 | 6/1954 | Wender et al. | 260—465 |

FOREIGN PATENTS 588,864  12/1949  Canada.

NICHOLAS S. RIZZO, *Primary Examiner.*